(12) United States Patent
Franklin et al.

(10) Patent No.: US 10,685,037 B2
(45) Date of Patent: Jun. 16, 2020

(54) VOLUME COHORTS IN OBJECT-REDUNDANT STORAGE SYSTEMS

(71) Applicant: Amazon Technologies, Inc., Reno, NV (US)

(72) Inventors: Paul David Franklin, Lake Forest Park, WA (US); Bryan James Donlan, Seattle, WA (US)

(73) Assignee: Amazon Technology, Inc., Seattle, WA (US)

( * ) Notice: Subject to any disclaimer, the term of this patent is extended or adjusted under 35 U.S.C. 154(b) by 450 days.

(21) Appl. No.: 14/133,522

(22) Filed: Dec. 18, 2013

(65) Prior Publication Data

US 2015/0169716 A1 Jun. 18, 2015

(51) Int. Cl.
*G06F 16/27* (2019.01)
(52) U.S. Cl.
CPC .................................... *G06F 16/27* (2019.01)
(58) Field of Classification Search
CPC ........................ G06F 17/30575; G06F 16/27
See application file for complete search history.

(56) References Cited

U.S. PATENT DOCUMENTS

| 5,548,724 | A | 8/1996 | Akizawa et al. |
| 7,788,569 | B2 * | 8/2010 | Hetzler ............... G06F 11/1076 714/777 |
| 8,224,935 | B1 | 7/2012 | Bandopadhyay et al. |
| 8,452,819 | B1 | 5/2013 | Sorenson, III et al. |
| 8,458,287 | B2 * | 6/2013 | Ozzie .................. G06F 11/1004 707/637 |
| 8,504,535 | B1 | 8/2013 | He et al. |

(Continued)

FOREIGN PATENT DOCUMENTS

| JP | H06332782 | 12/1994 |
| JP | 2003029933 | 1/2003 |
| WO | 2012178040 | 12/2012 |

OTHER PUBLICATIONS

Proceedings of the Ninth International Conference on Architectural Support for Programming Languages and Operating Systems, "OceanStore: An Architecture for Global-Scale Persistent Storage", John Kubiatowicz, et al., Nov. 2000, pp. 1-12.

(Continued)

*Primary Examiner* — Brittany N Allen
(74) *Attorney, Agent, or Firm* — Robert C. Kowert; Kowert, Hood, Munyon, Rankin & Goetzel, P.C.

(57) ABSTRACT

Cohorts may be created on storage nodes in an object-redundant storage system that uses replication and/or a redundant encoding technique. In a cohort with N nodes, M data elements (replicas or shards) of an object are stored to M of the nodes that are randomly (or otherwise) selected from the N nodes. Metadata for locating other data elements for an object in the cohort may be stored with one or more of the data elements in the cohort. To retrieve an object from a cohort, a subset of the nodes may be queried; the subset may be randomly or otherwise selected. If enough data elements are retrieved for the object from the queried nodes, the object is provided to the requester. Otherwise, additional data elements may be retrieved according to the metadata returned with a data element or by querying additional nodes.

22 Claims, 8 Drawing Sheets

(56) References Cited

U.S. PATENT DOCUMENTS

| | | | | |
|---|---|---|---|---|
| 8,799,746 | B2* | 8/2014 | Baker | G06F 11/10 |
| | | | | 714/762 |
| 8,856,619 | B1* | 10/2014 | Cypher | G06F 11/1044 |
| | | | | 714/6.2 |
| 2003/0018851 | A1 | 1/2003 | Ikeuchi et al. | |
| 2005/0246393 | A1 | 11/2005 | Coates et al. | |
| 2006/0080574 | A1* | 4/2006 | Saito | G06F 11/1076 |
| | | | | 714/11 |
| 2008/0065704 | A1 | 3/2008 | MacCormick et al. | |
| 2011/0137916 | A1 | 6/2011 | Deen et al. | |
| 2012/0079190 | A1* | 3/2012 | Colgrove | G06F 11/1076 |
| | | | | 711/114 |
| 2012/0166487 | A1* | 6/2012 | Stougie | G06F 11/1076 |
| | | | | 707/792 |
| 2012/0271795 | A1* | 10/2012 | Rao | G06F 17/30575 |
| | | | | 707/613 |
| 2013/0124525 | A1 | 5/2013 | Anderson et al. | |
| 2013/0138607 | A1 | 5/2013 | Bashyam et al. | |
| 2013/0275815 | A1 | 10/2013 | De Keyser et al. | |

OTHER PUBLICATIONS

J. J. Wylie, M. W. Bigrigg, J. D. Strunk, G. R., Ganger, H. Kilite, P. K. Khosla, "Survivable Information Storage Systems", IEEE Computer 33 (8), IEEE, Aug. 2000, pp. 61-68.

A. Malik and P. Lakshman, "Cassandra: a decentralized structured storage system," SIGOPS Operating System Review, vol. 44, No. 2, 2010.

R. Rodrigues and B. Liskov, "High availability in DHTs: Erasure coding vs. replication," in Proc. IPTPS, 2005.

U.S. Appl. No. 14/133,575, filed Dec. 18, 2013, Bryan James Donlan.

International Search Report and Written Opinion from PCT/US14/71159, dated Apr. 30, 2015, Amazon Technologies, Inc., pp. 1-14.

Partial Supplementary European Search Report from Application PCT/US2014071159, dated Jul. 26, 2017, Amazon Technologies, Inc., pp. 1-14.

Office Action from Japanese Application No. 2016/540658, dated Jul. 25, 2017, Amazon Technologies, Inc., Pages.

Office Action from Canadian Application No. 2934041, (Amazon Technologies Inc.), dated Nov. 28, 2018, pp. 1-5.

* cited by examiner

VOLUME COHORTS IN OBJECT-REDUNDANT STORAGE SYSTEMS

BACKGROUND

A typical data storage application or service may receive requests to store data objects on behalf of one or more clients and store the data objects to one or more storage nodes. Some data storage services, which may be referred to as object-redundant storage systems, may store data objects using a redundancy technique or scheme in order to provide a higher level of durability for the stored data. For example, a data storage service may replicate the data objects it stores across two or more different storage nodes or locations to increase the likelihood that data objects will survive the failure of any given storage node or combination of nodes. In some object-redundant storage systems, each replica need not correspond to an exact copy of the object data. For example, in some object-redundant storage systems, a data object may be divided into a number of portions or "shards" according to a redundant encoding technique (e.g., erasure encoding), and each of the shards may be stored to a different storage node.

In systems in which data objects are simply replicated across multiple nodes, only one replica needs to be retrieved to retrieve the data object. However, when using a redundant encoding technique such as erasure encoding, a data object may generally be recreated from more than one, but fewer than all, of the generated shards. For example, using an erasure encoding technique that generates 20 shards from a data object, at least 10 shards may be required to recreate the data object.

Figure 1:
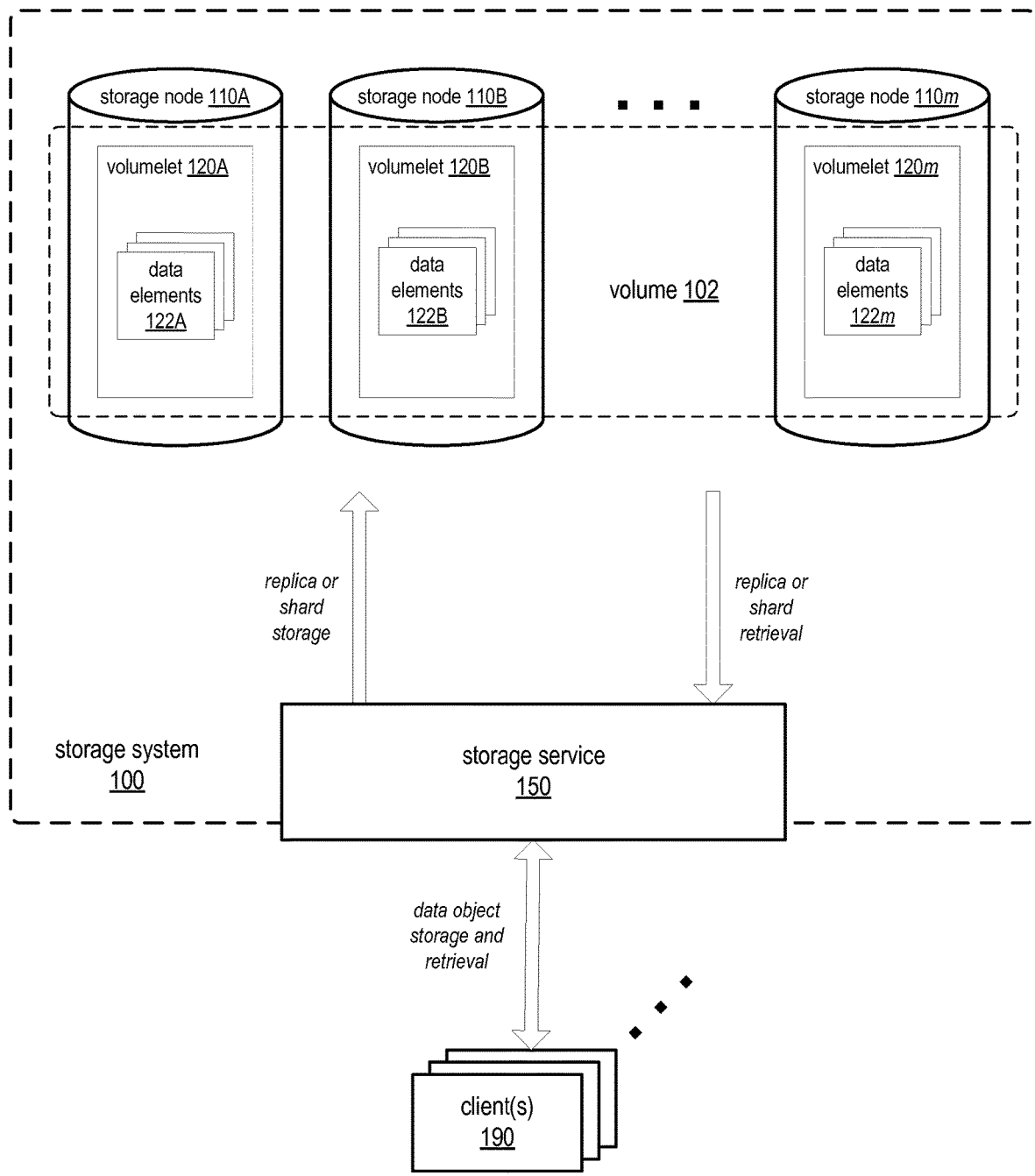
FIG. 1 illustrates an object-redundant storage system in which data objects are stored to aggregate groups of storage locations, where one data element generated from a given data object is stored to each location in the group.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for providing volume cohorts in object-redundant storage systems are described. In an object-redundant storage system, data objects may be replicated according to a replication technique and the replicas may be stored to two or more different storage locations. Instead or in addition, a redundant encoding technique such as erasure encoding may be used in an object-redundant storage system to generate multiple shards from a data object, and the shards may be stored across multiple different storage locations. For the purpose of this document, replication techniques and redundant encoding techniques may collectively be referred to as object-redundant techniques. For the purpose of this document, replicas and shards of data objects may be collectively referred to as object-redundant data elements, or simply data elements, where one data element corresponds to one replica or one shard of a given data object. Also note that a data object as used herein may be any type of data, and may be of any size that may be stored to locations in an object-redundant storage system. Moreover, a data object may include a single data element or single type of data, a collection of data elements of the same type or of different types, or even a collection of data objects.

A conventional technique for locating these data elements (replicas or shards) of persisted data in an object-redundant storage system is to choose the locations for the data elements for every data object independently, for example using a random selection or some other technique to select a set of locations for the data elements generated for a given data object from among all of the storage nodes in the storage system. However, this method generally involves a large amount of metadata for tracking the storage locations of the data elements for each object, and may involve a large amount of overhead when locating a data object for retrieval and/or when recovering from a failed storage device or node.

As an alternative to the above technique that may reduce the amount of metadata needed for tracking and reduce the overhead in retrieving data objects, groups of storage devices or portions of storage devices may be created in a storage system. Data objects may then be assigned to a group, with one data element generated from a given data object stored to each member device (or portion of a device) in the group. To locate a data object, the group on which the data object is stored is first located, and then the data object may be retrieved from the location(s) in the group. An example storage system 100 that implements this technique is illustrated in FIG. 1. A storage system 100 may include multiple storage nodes 110 and a storage service 150 that provides an interface (e.g., an application programming interface (API)) via which one or more clients 190 may store data objects to and retrieve data objects from storage system 100. As shown in FIG. 1, a group of storage nodes 110A-110m or portions of storage nodes 110A-110m may constitute or contain a volume 102. Note that there may be more storage nodes 110, other groups of storage nodes 110, and other volumes 102 in storage system 110 than those shown in FIG. 1.

In the broadest sense, a volume, as used herein, is a collection of data objects, and may be viewed as a virtual storage device that may be spread across two or more physical storage nodes 110. For example, volume 102 is spread across nodes 110A-110m as shown in FIG. 1. A volume 102 may be viewed as being composed of multiple volumelets 120. A volumelet 120 may generally be a contiguous block of storage on a storage node 110, and each volumelet 120 may contain thousands or millions of data elements 122. Each volumelet 120 resides on a single storage node 120; however, a volume 102's volumelets 120 each may typically reside on a different storage node 110. While not shown in FIG. 1, two or more volumelets 120 from two or more different volumes 102 may co-exist on the same storage node 110. Further, two or more volumes 102 in a storage system 100 may span the same storage nodes 110, different groups of storage nodes 110, or overlapping groups of storage nodes 110. While a volume 102 may be composed of multiple volumelets 120, the storage service 150 interface may present the volume 102 to the client(s) 190 as a single virtual storage device or system.

In the storage system 100 illustrated in FIG. 1, the data elements 122 on each volumelet 120 of a volume 102 may correspond to the same set of data objects, and each data object has a data element 122 (a shard or replica) stored on each volumelet 120. In other words, each volumelet 120 includes a data element 122 (a shard or replica) for each of the data objects stored to the volume 102, and a volumelet 120 may thus be viewed as a single replica, or "shard", of a volume 102. Using FIG. 1 to illustrate this, if a replication technique is used to persistently store data objects received from client(s) 190, then a replica of each data object is stored to each of the volumelets 120A-120m of volume 102 as a data element 122, and the set of data elements 122 on each volumelet 120 should generally be identical. Alternatively, if a redundant encoding technique (e.g., erasure encoding) is used to persistently store data objects received from client(s) 190, then m shards are generated from each data object, and a different one of the shards is stored to each of volumelets 120A-120m of volume 102 as a data element 122. Thus, the data elements 122 in the volumelets 120 of volume 102 should generally all correspond to the same set of data objects.

In a storage system 100 in which data objects are replicated in the volumelets 120 across the nodes 110, only one replica needs to be retrieved from the volume 102 to retrieve the data object. However, when using a redundant encoding technique such as erasure encoding in a storage system 100, a data object may generally be recreated from more than one, but fewer than all, of the generated shards stored in the volumelets 120. For example, using an erasure encoding technique that generates m shards from a data object and stores a different one of the shards as a data element 122 to each of the volumelets 120A-120m as shown in FIG. 1, a shard would need to be retrieved from some subset of the m volumelets 120 to recreate a corresponding data object. As a non-limiting example, an erasure encoding scheme may be used in which m shards are created and half the shards are necessary to recreate the data objects, and therefore the (minimum) number of shards that are needed to recreate a data object may be m/2.

While a technique for storing data elements in an object-redundant storage system as described above in reference to FIG. 1 may reduce the amount of metadata needed to track data objects and may reduce the overhead needed to retrieve a given data object when compared to the first technique described in which the data elements (replicas or shards) are stored to locations selected for each data element independently, the technique illustrated in FIG. 1 creates the potential for a condition that may be referred to as a correlated failure.

Using the first or second techniques, if a single (or even a few) storage node in the storage system goes down, then data object(s) stored on that node can generally be recovered from data elements (replicas or shards) stored on other storage nodes in the storage system. However, multiple node failures in a storage system may result in some data loss. Using the first technique a multiple node failure in the storage system may result in some individual data objects being lost and not recoverable from the storage system. For example, if each data element (shard or replica) is stored to each of four nodes independently selected from an arbitrarily larger number of nodes in the storage system, then a failure of four nodes in the storage system may result in some relatively small subset of distinct data objects being lost.

However, using the second technique, a multiple node failure may potentially result in an entire volume of data objects being lost. Using the second technique, generally, if any data objects are lost from a volume due to a multiple node failure, then all of the data objects from the volume are lost. This is what is referred to as a correlated failure. Using a replication scheme in which m replicas are stored to m volumelets in a volume, then losing m storage nodes in a storage system may result in the loss of all of the data objects stored in one or more volumes that span those particular m storage nodes. Using a redundant encoding technique such as erasure encoding in which m shards of a data object are stored to m volumelets in a volume and in which a subset of the shards are needed to recreate the data object, then losing one more than the fraction of the m storage nodes needed to recreate data objects in the storage system (e.g., (m/2)+1 storage nodes, if ½ of the m shards are needed to recreate a data object) may result in the loss of all of the data objects stored in one or more volumes that span those particular m storage nodes.

While the mean time between failure (MTBF) of individual data objects using the two techniques described above may be close or the same, a multiple node failure using the second technique that results in a correlated failure and that thus affects entire volume(s) may be much more visible, and much less desirable, for clients of the storage system than a multiple node failure using the first technique in which generally uncorrelated data objects may be lost.

Volume Cohorts in Object-Redundant Storage Systems

Embodiments of methods and apparatus for providing volume cohorts in object-redundant storage systems are described that may provide advantages of the above two techniques while reducing the problems of the two techniques. Embodiments of a volume cohort technique or method are described that may be implemented in object-redundant storage systems and that may reduce the amount of metadata needed to track data objects and/or the overhead needed to retrieve a given data object when compared to the first technique, while at the same time reducing or eliminating the correlated failure problem of the second technique.

In embodiments, volume cohorts, or simply cohorts, may be created that span sets or groups of storage nodes in an object-redundant storage system. Similar to the volumes described for the storage system as illustrated in FIG. 1, a cohort in an object-redundant storage system may be viewed as a virtual storage device that may be spread across two or more physical storage nodes. However, unlike the volumes described in reference to FIG. 1, a given data object stored to a cohort according to an object-redundant technique spans only a subset of the storage nodes in the cohort. Thus, if there are N storage nodes in a cohort, then the data elements (replicas or shards) of any given data object are only stored to M of the storage nodes in the cohort, where M is less than N. Similar to the volumes described for the storage system as illustrated in FIG. 1, a volumelet of the cohort is located on each of the N storage nodes in the cohort. However, unlike in the storage system as illustrated in FIG. 1, the cohort volumelets are not identical; that is, the cohort volumelets do not each contain a set of data elements for the same set of data objects, as each data object stored to the cohort does not have a data element (a shard or replica) stored on each volumelet of the cohort.

Figure 2A:
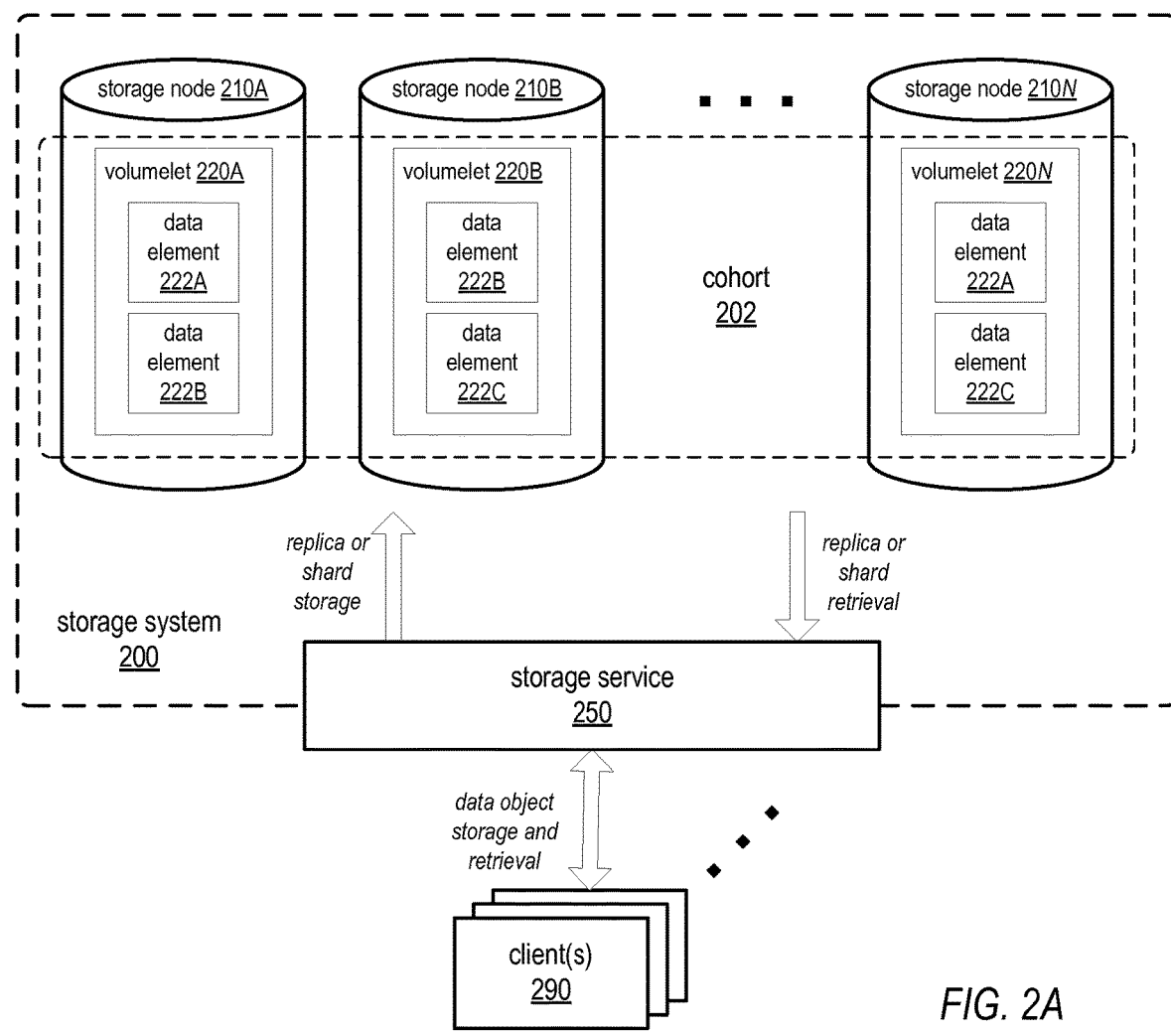
FIGS. 2A and 2B illustrate an object-redundant storage system that implements volume cohorts, according to at least some embodiments.
Figure 2B:
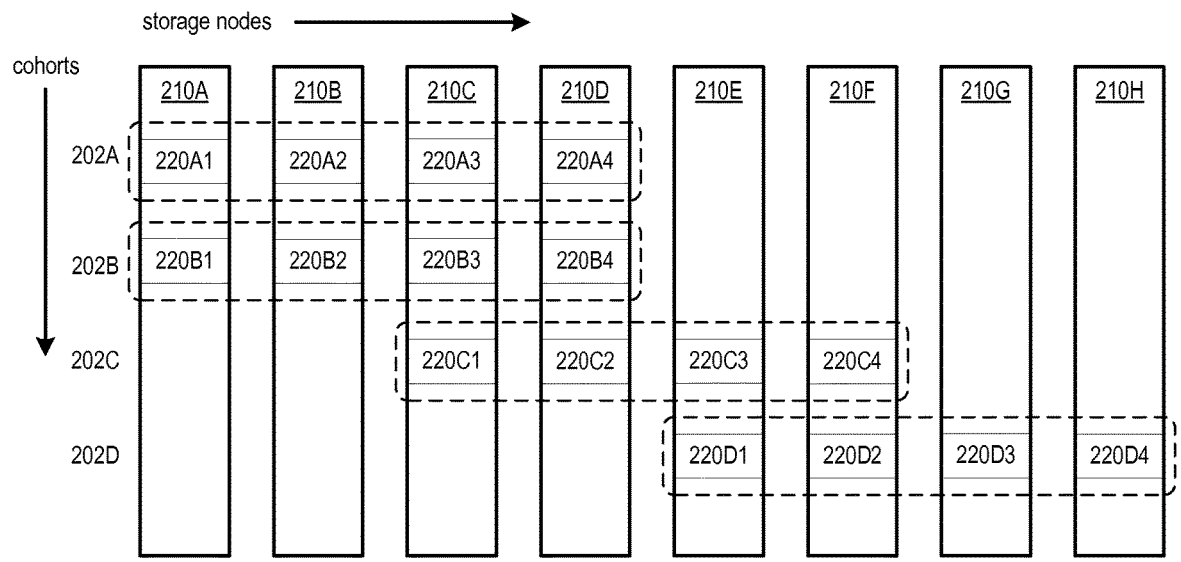

FIGS. 2A and 2B illustrate an object-redundant storage system that implements volume cohorts according to at least some embodiments. As shown in FIG. 2A, a storage system 200 may include multiple storage nodes 210 and a storage service 250 that provides an interface (e.g., an application programming interface (API)) via which one or more clients 290 may store data objects to and retrieve data objects from storage system 200. Note that the storage system 200 may generally be any storage system that provides object-redundant storage to client(s). For example, the storage system 200 may be a local storage system coupled to one or more client devices, a network-based storage system 200 coupled to a local network and accessible to multiple clients on the local network, or a remote, virtualized storage system implemented on a provider network, provided as a remote, virtualized storage service to multiple clients, and accessible to the clients according to an API and via an intermediate network such as the Internet.

As shown in FIG. 2A, a cohort 202 may span multiple storage nodes 210A-210N in a storage system 200. Cohort 202 may be viewed as a virtual storage device that is spread across the nodes 210A-210N as shown in FIG. 2A. Cohort 202 may include multiple volumelets 220A-220N, where each volumelet 220 may be a contiguous block of storage on a storage node 210, and each volumelet 220 stores data elements 222 (shards or replicas) of data objects that are stored to the storage system 200. Each volumelet 220 resides on a single storage node 220; however, a cohort 202's volumelets 220 typically reside on different storage nodes 210. Further, while a cohort 202 may be composed of multiple volumelets 220, the storage service 250 interface may present the cohort to the client(s) 290 as a single virtual storage device or system.

Note that FIG. 2A shows just one cohort 202 spread across N storage nodes 210 for simplicity. However, there may be more storage nodes 210 and more cohorts 202 in a storage system 210 than those shown in the example of FIG. 2A. As shown in FIG. 2B, two or more cohorts 202 in a storage system 200 may span the same storage nodes 210 (cohorts 202A and 202B in FIG. 2B), different groups of storage nodes 210 (cohorts 202A and 202D in FIG. 2B), or overlapping groups of storage nodes 210 (cohorts 202A and 202C in FIG. 2B). Thus, two or more volumelets 220 from two or more different cohorts 202 may co-exist on the same storage node 210. For example, storage node 210C in FIG. 2B includes volumelet 220A3 of cohort 202A, volumelet 220B3 of cohort 202B, and volumelet 220C1 of cohort 202C. Thus, each storage node 210 in a storage system 200 may participate in multiple cohorts 202, and two or more cohorts 202 in which a given storage node 210 participates may have different member nodes 210 (that is, different sets of storage nodes 210 that participate in the respective cohorts 202).

Referring again to FIG. 2A, given N storage nodes 210 in a cohort 202, then the data elements 222 (replicas or shards) of any given data object are only stored to M of the volumelets 220 on the storage nodes 210 in the cohort 202, where M is less than N. Further, the particular M volumelets 220 to which the data elements 222 for each data object are stored may be determined by a selection technique (e.g., a random selection technique) that selects the M volumelets 220 from among all N volumelets 220 such that the data elements 222 are distributed among all N volumelets 220. In other words, the set of M volumelets 220 to which the data elements 222 for a first data object are stored may generally be (but is not necessarily) a different set of M volumelets 220 to which the data elements 222 for a second data object are stored.

Thus, in the example storage system 200 illustrated in FIG. 2A, unlike the volumes 102 in the example storage system illustrated in FIG. 1, the data elements 222 on each volumelet 220 of the cohort 202 do not correspond to the same set of data objects, as the data elements 222 for a given data object are stored to only a subset of the N volumelets 220. For example, in FIG. 2A, data element 222A is stored on volumelets 220A and 220N, but not on volumelet 220B, and data element 222B is stored on volumelets 220A and 220B, but not on volumelet 220N.

In a storage system 200 as illustrated in FIG. 2A, if a replication technique is used to persistently store data objects received from client(s) 290, then M volumelets are selected from the N volumelets of cohort 202, and a replica of the data objects is stored to each of the M volumelets as a data element 222. Alternatively, if a redundant encoding technique (e.g., erasure encoding) is used to persistently store data objects received from client(s) 290, then M shards are generated from each data object, M volumelets are selected from the N volumelets of cohort 202, and a different one of the shards is stored to each of the selected M volumelets as a data element 222. Note that in a system in which a redundant encoding technique such as erasure encoding is used, the total number of shards generated by the technique may determine M.

In a storage system 200 as illustrated in FIG. 2A in which data objects are replicated across M of the N volumelets 220 of cohort 202, only one replica needs to be retrieved from the cohort 202 to retrieve the data object. However, when using a redundant encoding technique such as erasure encoding in a storage system 200, a data object may generally be recreated from more than one, but fewer than all, of the generated shards stored in the volumelets 220. For example, using an erasure encoding technique that generates M shards from a data object and stores a different one of the shards as a data element 222 to each of the M selected volumelets 220 as shown in FIG. 2A, a shard would need to be retrieved from some subset of the M volumelets 220 to recreate a corresponding data object. As a non-limiting example, an erasure encoding scheme may be used in which M shards are created and half the shards are necessary to recreate the data objects, and therefore the (minimum) number of shards that are needed to recreate a data object may be M/2. In this document, the number of shards that are needed to recreate a data object using a redundant encoding scheme such as erasure encoding may be referred to as R; therefore, in this example, R=M/2. As just one specific example, an erasure encoding scheme may be used in which 20 shards are generated for a data object (M=20), and 10 shards are required to recreate the data object (R=10). As another example, an erasure encoding scheme may be used in which 22 shards may be generated for a data object (M=22), with 11 shards required to recreate the data object (R=11).

In some implementations of a cohort 202 in a storage system 200 as illustrated in FIG. 2A, M may be selected to be half of N, or N may be selected to be twice M. For example, in example implementations, M=20 and N=40, or M=22 and N=44. In these implementations, each data object is stored to exactly half of the volumelets 220 in the cohort 202. However, other values for M and/or N, and other ratios of N to M, may be used in embodiments. To provide some non-limiting examples, N may be selected to be 4M (e.g. M=10 with N=40), or M=20 with N=80.

The selection of M and N, and the ratio of N to M, may be implementation specific and may be based on factors including but not limited to a particular redundant encoding scheme used, the number of storage nodes available, and tradeoffs between performance overhead and data loss protection. In regard to tradeoffs between performance overhead and data loss protection, note that a higher ratio of N to M (e.g., 3:1, 4:1, or more) may lower the expected number of data objects that would be lost in a given event while increasing overhead since more storage nodes are involved, while a lower ratio of N to M (e.g., 2:1, 3:2, or less) may increase the expected number of data objects that would be lost in a given event with less overhead. For a given implementation, values for M and N may be determined that provide an adequate level of risk reduction with an acceptable amount of overhead for the implementation. Some binomial calculations are provided later in this document that may be used in evaluating and possibly selecting values for M and N.

Figure 3A:
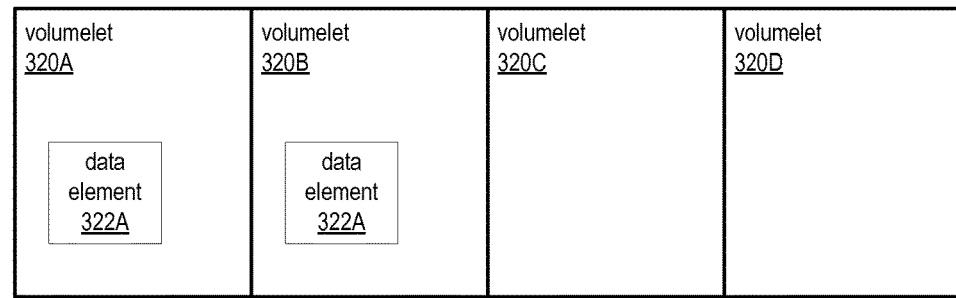
FIGS. 3A and 3B illustrate example cohorts, according to at least some embodiments.

To illustrate how volume cohorts 202 in storage systems 200 as illustrated in FIG. 2A may overcome the correlated failure problem that may occur in storage systems 100 as illustrated in FIG. 1 in which each data object is stored across all of the volumelets 120 in a volume 102, a simple example cohort 302A is provided in FIG. 3A. In cohort 302A, M=2, and N=4, so there are four volumelets 320A-320D, and two data elements 322 (replicas or shards) for a given data object may be created and stored to any two of the volumelets 320 as determined by a selection technique. FIG. 3A shows a data element 322A (which may be replicas of a data object or shards created from a data objects) stored to volumelets 320A and 320B. Given four volumelets from which any two are to be selected, there are six possible unordered combinations C of two volumelets 320 to which the data elements 322 for a data object may be stored:

[AB, AC, AD, BC, BD, CD]

Note that order is not important; in other words AB=BA and CD=DC. Assuming a random distribution of data elements among the four volumelets 320 in the cohort 302A, for replicated data objects, the odds that a given data object will be lost given the failure of two of the four storage nodes that host the volumelets 320 are 1 in 6. In other words, if two of the four storage nodes that host the volumelets 320 are lost, only about 1 out of 6 of the data objects stored in the cohort 302A according to a replication technique may be lost.

Generalizing, the number of unordered combinations C of volumelets in a cohort to which data objects may be stored from values for M and N is given by the binomial coefficient $$\binom{n}{k},$$

which is read "n choose k":

$$C = \binom{n}{k} = \frac{n!}{k!(n-k)!}$$

where n! is a factorial function, and where k=M and n=N. For example, for M=2 and N=4 as shown in FIG. 3A, there are $$\binom{4}{2} = 6$$

combinations of volumelets to which data objects may be stored.

Figure 3B:
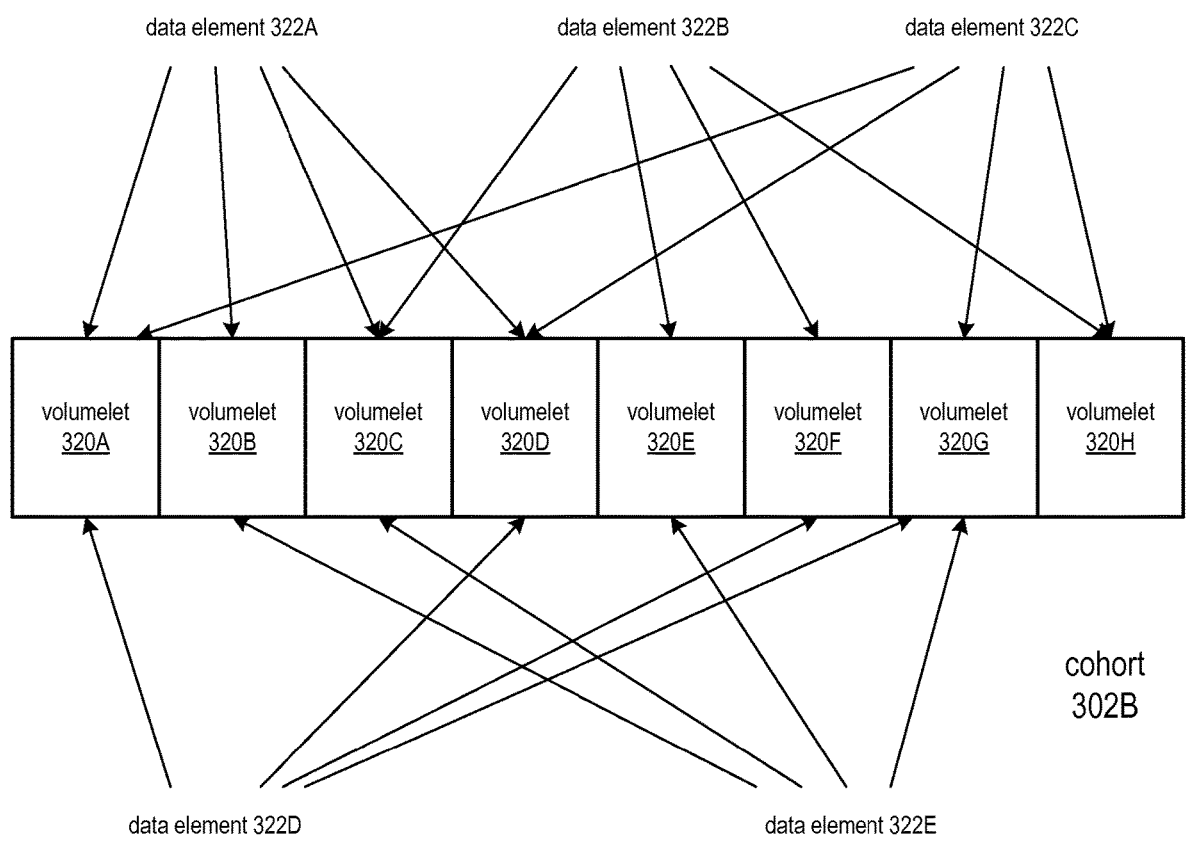

FIG. 3B shows an example cohort 302B in which there are eight volumelets 320A through 320H, and in which the data elements 322 for each data object are stored to four of the volumelets 320. Thus, in cohort 302B of FIG. 3B, M=4 and N=8. Applying the binomial coefficient to find the number of combinations:

$$C = \binom{8}{4} = 70$$

Thus, there are 70 possible combinations of four volumelets/storage nodes to which data objects may be stored in cohort 302B, and the loss of any combination of four of the eight storage nodes in cohort 302B may result in the loss of about 1 out of 70 of the data objects when using replication. Different combinations of volumelets 320 in cohort 302B at which the data elements 322 from five example data objects are shown in FIG. 3B. For example, data elements 322A for a first data object are stored to 320A, 320B, 320C, and 320D, while data elements 322B for a second data object are stored to 320C, 320E, 320F, and 320H.

A few other non-limiting examples of unordered combinations C given different values for M and N are presented below:

$$M = 10, N = 20: C = \binom{20}{10} = 184{,}756$$

$$M = 18, N = 36: C = \binom{36}{18} = 9{,}075{,}135{,}300$$

$$M = 18, N = 20: C = \binom{20}{18} = 190$$

Thus, as an example of how volume cohorts 202 in storage systems 200 as illustrated in FIG. 2A may overcome the correlated failure problem that may occur in storage systems 100 as illustrated in FIG. 1, in a cohort in which M=10 and N=20, C=184,756, and using a replication scheme in which M replicas of a data object are stored to M volumelets in the cohort and in which different combinations of M volumelets are selected from the N volumelets according to a selection technique, then losing M storage nodes in the storage system may result in the loss of only about 1 out of 184,756 of the data objects stored to a cohort spanning N storage nodes that includes those particular M storage nodes. Moreover, if fewer than M storage nodes are lost from a cohort, then generally no replicated data objects are lost, as at least one of the remaining volumelets should include a replica for any given data object, and a data object may be recovered from a single replica.

The calculation to find the number of data objects that are lost given a failure of a certain number of storage nodes is different in a cohort when using a redundant encoding technique such as erasure encoding in which M shards of a data object are stored to M volumelets selected from the N volumelets in a cohort according to a selection technique, and in which a subset R of the shards are needed to recreate the data object. In such a system, a data object may be lost if (M−R)+1 shards are lost. As a simple example, in a cohort in which R=2, M=4 and N=8, a data object may be lost if (4−2)+1=3 shards are lost. Thus, even though each data object is stored (as shards) to four of the eight volumelets in the cohort, a loss of any three volumelets may result in the loss of any data objects that happen to have shards stored to all three of the lost volumelets. Thus, instead of:

$$C = \binom{N}{M} = \binom{8}{4} = 70$$

as is the case when storing data objects using replication, the calculation becomes:

$$C = \binom{N}{(M-R)+1} = \binom{8}{3} = 56$$

In other words, the loss of any three volumelets in this example cohort in which R=2, M=4, and N=8 results in the loss of about 1 out of 56 of the data objects that are stored as shards to the cohort according to a redundant encoding scheme.

Given a loss of any four volumelets in this example cohort, since there are four possible unordered combinations of three volumelets in a set of four volumelets:

$$C = \binom{4}{3} = 4$$

Thus, a failure of any four volumelets may result in the loss of about 4 out of 56, or 1 in 14, of the data objects stored in the cohort according to the redundant coding technique.

As another example, in a cohort in which R=5, M=10 and N=20, a data object may be lost if (10−5)+1=6 shards are lost, and the calculation is:

$$C = \binom{20}{6} = 38,760$$

In other words, the loss of any six volumelets in this example cohort results in the loss of about 1 out of 38,760 of the data objects that are stored as shards to the cohort according to a redundant encoding scheme. Given a loss of any ten volumelets in this example cohort, since there are 210 possible unordered combinations of six volumelets in a set of ten volumelets:

$$C = \binom{10}{6} = 210$$

Thus, a failure of any ten volumelets may result in the loss of about 210 out of 38,760, or about 1 in 185, of the data objects stored in the cohort according to the redundant coding technique.

Note that, if fewer than (M−R)+1 storage nodes are lost from a cohort in which a redundant encoding scheme such as erasure encoding is used, then generally no data objects are lost, as the remaining volumelets in the cohort should include enough shards to recreate any given data object.

The above calculations may, for example, be used to find the potential loss rate in particular cohort configurations and with particular redundant encoding schemes, and thus may be used to evaluate risk at different values of R, M, and N in object redundant storage systems that employ volume cohorts. The results may, for example, be used in evaluating tradeoffs between performance overhead and data loss protection, in selecting redundant encoding schemes, and in selecting values for R, M, and/or N in particular volume cohort implementations Selecting Sets of Volumelets In embodiments, the particular M volumelets in a cohort to which the data elements for each data object are stored may be determined by a selection technique that selects the M volumelets from among all N volumelets such that the data elements are distributed more or less evenly among all N volumelets. In other words, the set of M volumelets to which the data elements for a first data object are stored may generally be (but is not necessarily) a different set of M volumelets to which the data elements for a second data object are stored. In some embodiments, a random or pseudo-random technique may be used to select the particular set of volumelets to which the data elements for a given data object are to be stored. However, in some embodiments, one or more factors may be considered when selecting the M volumelets from a cohort on which to store a data object. These factors may include one or more of, but are not limited to, available storage space on the storage nodes in the cohort, current availability of the storage node, and bandwidth considerations to the storage nodes.

In some embodiments, selecting the particular M volumelets in a cohort to which the data elements for a given data object are to be stored may be at least in part based on the identity of the data object, or on a transformation (such as a hash) of the identity. As an example of an identity of a data object, in at least some embodiments, each data object may be indicated by an object identifier (object ID) that may uniquely identify the data object in the storage system. The object IDs may be of any suitable type (alphanumeric string, numeric, etc.) and of any suitable length or size (32-bit, 64-bit, 128-bit, etc.).

As an example of selecting volumelets based on data object identity, the N storage nodes in a cohort may be split into N/2 pairs of storage nodes, a given bit of a hash (or other transformation) of the identity of a data object may correspond to a given pair of storage nodes, and the bit may be used to indicate which storage node in that given pair contains a data element for this data object. As a simple illustration, in a cohort with 16 storage nodes/volumelets designated as A-P, the storage nodes may be paired as follows:

| Pair 1 | Pair 2 | Pair 3 | Pair 4 | Pair 5 | Pair 6 | Pair 7 | Pair 8 |
|---|---|---|---|---|---|---|---|
| A-B | C-D | E-F | G-H | I-J | K-L | M-N | O-P |

A 0 bit may designate the first node in a pair, and a 1 bit may designate the second node in a pair. An eight-bit portion of a hash of the identity of an example data object may, for example, be:

10011100

Assuming the leftmost bit corresponds to Pair 1, data elements (replicas or shards) of this data object will be stored in nodes B, C, E, H, J, L, M, and O of the eight pairs. Since hashes of the identities of other data objects should generate relatively random combinations of bits, the data elements will tend to be relatively evenly distributed to the nodes in each pair, and to the nodes overall.

Note that the above scheme that uses a hash of the identity of an object to store data elements among pairs of nodes is given by way of example, and is not intended to be limiting. The identity of a data object, or a transformation thereof, may be used in other ways than those described to select among the nodes in a cohort for storing the data elements generated from the data object. For example, a hash or other transformation of an object ID may deterministically indicate a particular subset of M storage nodes in the cohort to which data elements generated from the respective data object are to be stored. Further note that, in addition to using the identity of a data object to select storage nodes in a cohort, in at least some embodiments the identity of data objects (e.g., a hash or other transformation of the identity of a data object) may be used in retrieving data objects from the cohort, for example in locating data element(s) (shards or replicas) of the data object that were previously stored in the cohort according to a hash of the identity.

Tagging Data Elements with Metadata

In at least some embodiments of an object-redundant storage system that implements volume cohorts, at least one of the M data elements generated from a data object stored to the set of M volumelets selected from the N volumelets in the cohort may be tagged with metadata that may be used by the storage service in locating others of the data elements generated from the data object and stored to the cohort. The metadata for a given data element on a given volumelet may indicate all of the locations (storage nodes/volumelets) in the cohort on which the data element is stored. When the storage service retrieves a data element from a volumelet, the metadata (if present) is also retrieved, and may then be used to retrieve others of the data elements if necessary.

While this tagging of the data elements in the cohort with metadata indicating locations may be done for data elements that are replicas in an object-redundant storage system using a replication technique, the metadata may be particularly useful for data elements that are shards generated from data objects according to a redundant encoding technique such as erasure encoding, since some minimum number R of the M shards generated for a data object (e.g., M/2 shards) are needed to recreate the data object. When the storage service retrieves a shard, the metadata is also retrieved if present, and may be used by the storage service to locate the other shard(s) needed to recreate the respective data object.

Figure 4A:
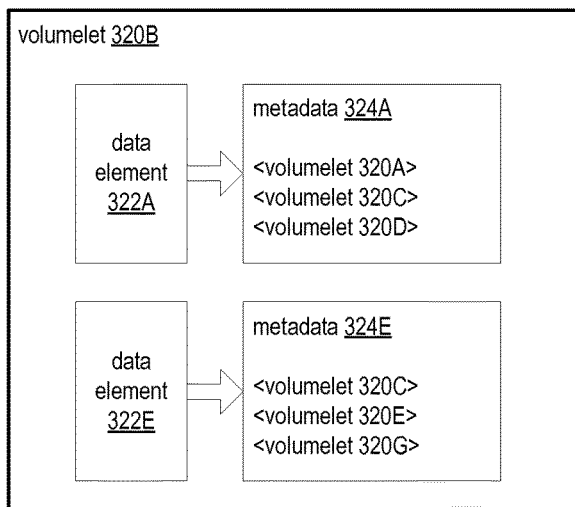
FIGS. 4A through 4C illustrate tagging data elements with metadata in a cohort, according to embodiments.
Figure 4B:
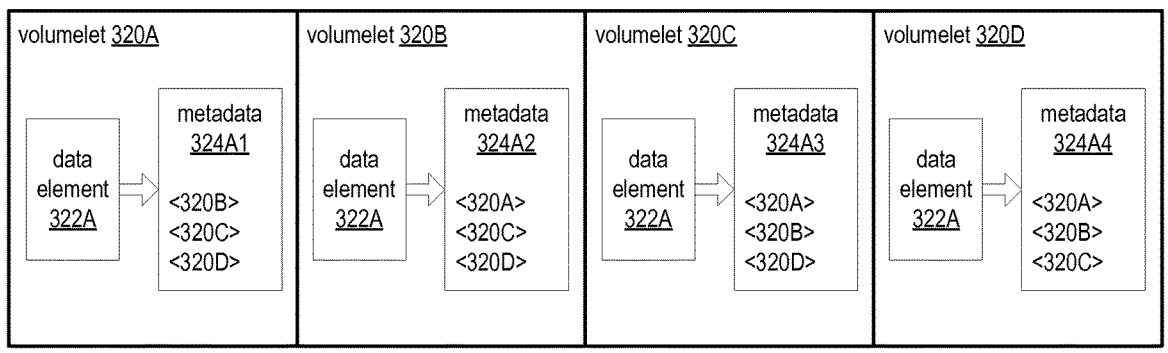
Figure 4C:
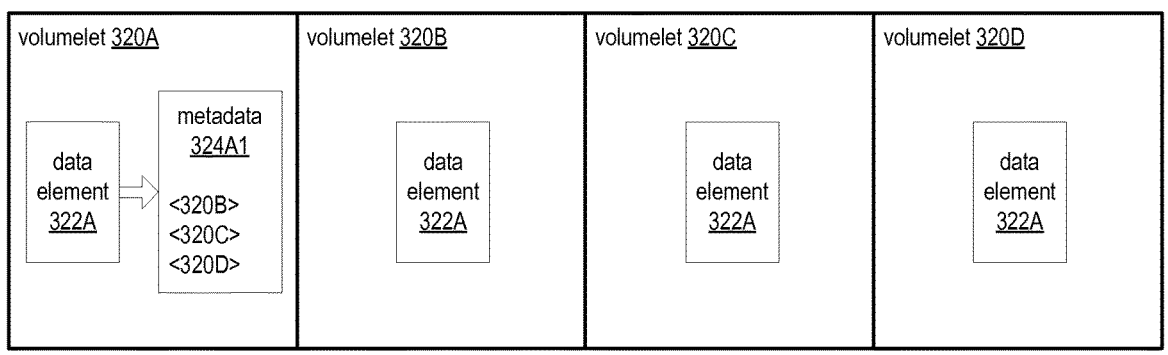

FIGS. 4A through 4C illustrate tagging data elements with metadata in a volume cohort, according to embodiments. These Figures use as an example the cohort 302B from FIG. 3B. In FIG. 4A, volumelet 320B from cohort 302B is shown. As shown in FIG. 3B, data elements 322A and 322E are stored on volumelet 320B. Data element 322A is tagged with metadata 324A that indicates that data element 322A is also located on volumelets 320A, 320C, and 320D. Data element 322E is tagged with metadata 324E that indicates that data element 322A is also located on volumelets 320C, 320E, and 320G. Note that, in some embodiments, for consistency, the metadata 324 for a given data element 322 on a volumelet 320 may also indicate that the data element 322 is stored on that volumelet 320; for example, metadata 324A may indicate that data element 322A is located on volumelets 320A, 320B, 320C, and 320D.

The metadata 324 for the data elements 322 may be stored in any of a number of forms or representations in various embodiments. However, in at least some embodiments, a compact form may be used to reduce storage and data retrieval overhead. As just one non-limiting example, a simple representation for the metadata 324 would be a bit field, where each bit corresponds to one of the storage nodes/volumelets in the cohort. For example, the metadata 324 for the example cohort 302B in FIG. 3B may be an eight-bit field, with the leftmost bit corresponding to volumelet 320A, and so on. Using this example representation, the metadata 324A for data element 322A may be represented as:

11110000 indicating that data element 322A is located on volumelets 320A, 320B, 320C, and 320D in cohort 302B. The metadata 324E for data element 322E may be represented as:

01101010 indicating that data element 322E is located on volumelets 320B, 320C, 320E, and 320G in cohort 302B.

In some embodiments, the metadata 324 may be stored with each data element 322 generated for a data object. FIG. 4B shows the first four volumelets 320A-320D of the cohort 302B of FIG. 3B, and shows that data element 322A, stored to each of volumelets 320A-320D, are tagged with respective metadata 324A1-324A4 that indicates, for each data element 322A, the other locations (e.g., other volumelets 320) on the cohort 302B at which the data element 322A is also stored. If any one of the data elements 322A is retrieved by the storage service, its corresponding metadata 324A is also retrieved, and may be used in locating and retrieving one or more of the other data elements 322A stored on the cohort 302B.

Note that, in embodiments in which the metadata 324 is stored with each data element 322 for a data object, for any given pair of volumelets 320, each volumelet 320 in the pair knows (or it can be determined from the metadata 324 on the volumelet 320) what data objects (a) have a data element 322 (shard or replica) stored in the volumelet 320 and (b) should have a data element 322 (shard or replica) stored on the other volumelet 320 in the pair. For example, in FIG. 4B, the fact that volumelet 320A should store a data element 322A can be determined from the metadata 324A2 on volumelet 320B, and the fact that volumelet 320B should have a data element 322A can be determined from the metadata 324A1 on volumelet 320A. This information may, for example, be used in a process of identifying data objects that are missing data elements (shards or replicas) in a cohort, and thus need to be repaired.

As an example of using the metadata in an object-redundant storage system in which M shards are generated from data objects according to a redundant encoding technique such as erasure encoding and stored to M of the N volumelets in a cohort along with metadata for each shard, a storage service may generate the M shards from a data object and randomly select M volumelets from among the N storage nodes/volumelets in the cohort that have enough available space to store a shard of the data object. When each shard is stored, the locations of all of the M shards in the cohort are stored with the shard as metadata, for example in a compact form. To retrieve a data object from the cohort, the storage service may access at least R of the N volumelets in the cohort requesting the data object (and providing identity information for the requested data object), where R is the minimum number of shards needed to recreate a data object according to the redundant encoding scheme being used. In some cases, all of the R nodes may return a shard, in which case the data object can be recreated from the retrieved shards and the retrieval is done. In other cases, none of the R nodes may return a shard, in which case a non-overlapping set of R nodes may be accessed by the storage service to request the data object. However, in most cases, one or more of the R nodes may indicate that they do not store a shard for the indicated data object, while one or more others of the R nodes may return the shard along with the metadata indicating the other locations in the cohort at which shards for the object are stored. If any (but not all) of the nodes do return a shard along with the metadata, then the storage service knows that it needs to access additional nodes in the cohort to obtain additional shards, and can use the returned metadata to intelligently select the nodes in the cohort to be accessed.

In some embodiments, instead of storing the metadata 324 with each data element 322 generated for a data object, only a subset of the data elements 322 generated for a data object may be tagged with metadata. FIG. 4C shows the first four volumelets 320A-320D of the cohort 302B of FIG. 3B, and shows that data element 322A is stored to each of volumelets 320A-320D. However, only the data element 322A stored on volumelet 320A is tagged with metadata 324A1 that indicates the other locations (e.g., other volumelets 320) on the cohort 302B at which the data element 322A is also stored. If data element 322A is retrieved from volumelet 320A by the storage service, its corresponding metadata 324A1 is also retrieved, and may be used in locating and retrieving one or more of the other data elements 322A stored on the cohort 302B.

As an example of an object-redundant storage system in which metadata is stored with only a portion of the M shards generated from a data object and stored to the cohort, a storage service may generate the M shards from a data object and randomly select M volumelets from among the N storage nodes/volumelets in the cohort that have enough available space to store a shard of the data object. The locations of all of the M shards in the cohort are stored with only a subset of the shards as metadata. As an example, in a cohort with 40 volumelets (N=40), where M=20, and R=10, the metadata may only be stored with 5 of the shards. To retrieve a data object from the example cohort, the storage service may access 20 of the N volumelets in the cohort requesting the data object. Since there are 5 volumelets that include a shard and the metadata that indicates the locations of all of the other shards, the probability that at least one of these 5 volumelets will be among the 20 volumelets that are accessed is about 98%. (As another example, with a sample size of 10 instead of 20, the probability that at least one of these 5 volumelets will be among the 10 volumelets that are accessed is about 78%). Thus, the metadata may be stored with only a subset of the volumelets while still providing a high probability that the metadata will be obtained on a first access, given a sufficient sample size. Once the storage service obtains the metadata, the service can use the metadata to intelligently select additional nodes in the cohort to be accessed to obtain additional shards if necessary.

Some embodiments may use a hybrid method for storing data elements to and retrieving data elements from a cohort that is a combination of a method for tagging data elements stored to a cohort with metadata for locating other data elements in the cohort and a method that uses the identity of data objects (or a transformation thereof) to select storage locations for data elements in a cohort. For example, a hash of a data object's identity may be used to select the volumelets for one or more data elements generated from a data object, while the volumelets for storing the other data elements may be randomly chosen. The metadata for locating all of the data elements may be stored with the data elements for which the location is determined according to the hash of the identity. Thus, when retrieving a data object, a hash of the identity may direct the storage service to the location of one or more of the data elements for which metadata is stored, and the retrieved metadata may be used in intelligently retrieving additional data elements for the data object if necessary.

Figure 5:
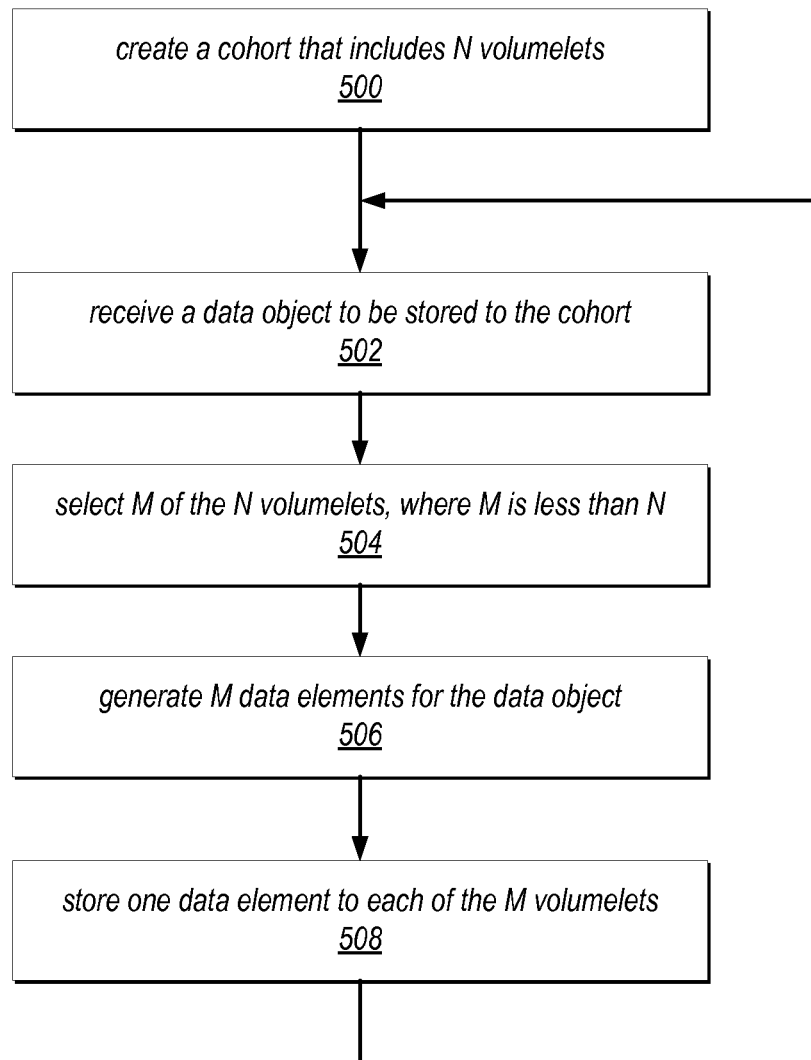
FIG. 5 is a high-level flowchart of a method for creating and storing data objects to a cohort in an object redundant storage system, according to at least some embodiments.
Figure 8:
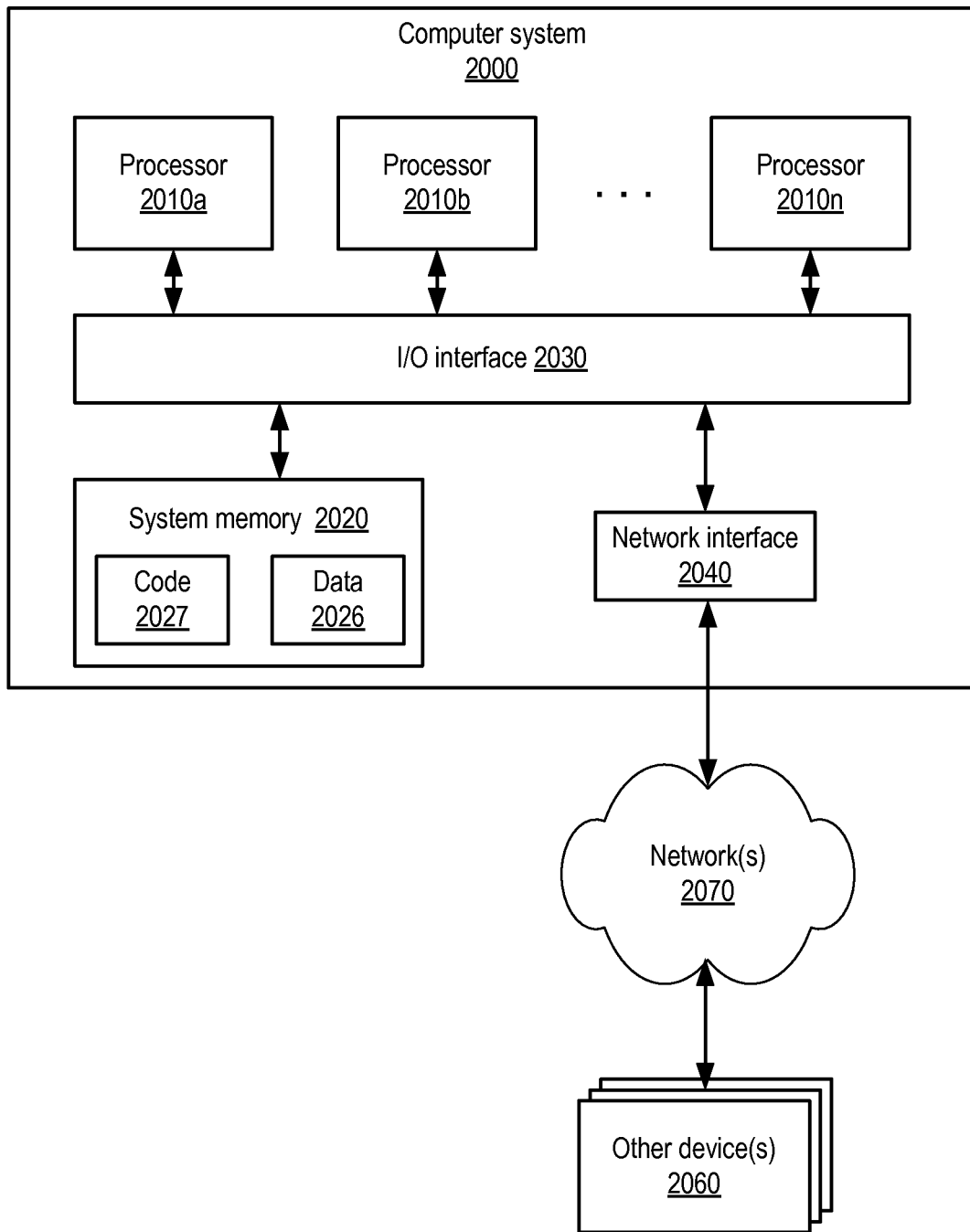
FIG. 8 is a block diagram illustrating an example computer system that may be used in some embodiments.

FIG. 5 is a high-level flowchart of a method for creating and storing data objects to a cohort in an object redundant storage system according to at least some embodiments. The method may, for example, be performed by or via a storage service implemented on one or more devices. An example system on which embodiments of a storage service may be implemented is shown in FIG. 8.

As indicated at 500, a cohort that includes N volumelets may be created. In at least some embodiments, each of the N volumelets may reside on a different storage node or device. In some embodiments, the cohort may be initialized by storing a base or initial set of data objects to the cohort. As indicated at 502, a data object to be stored to the cohort may be received, for example from one of one or more clients of the storage service.

As indicated at 504, the storage service may select M of the N volumelets to which the data object is to be stored, where M is less than N. In embodiments, different techniques may be used to select the M volumelets. For example, in some embodiments, a random or pseudo-random selection technique may be used. In some embodiments, one or more factors, such as available storage space, may be considered when selecting the M volumelets. In some embodiments, an identity of the data object (or a transformation thereof, such as a hash) may be used in determining at least some of the M volumelets. Combinations or variations of these techniques may be used in some embodiments.

As indicated at 506, M data elements may be generated for or from the data object. The data elements may, for example, be replicas of the data object generated according to a replication technique. Alternatively, the data elements may be shards of the data object generated according to a redundant encoding scheme such as erasure encoding.

As indicated at 508, one of the M data elements may be stored to each of the M selected volumelets in the cohort. In at least some embodiments, metadata indicating the storage location (e.g., volumelet) of at least one other of the M data elements may be stored with at least one of the M data elements. In some embodiments, the metadata is stored with each of the M data elements in the cohort.

Figure 6:
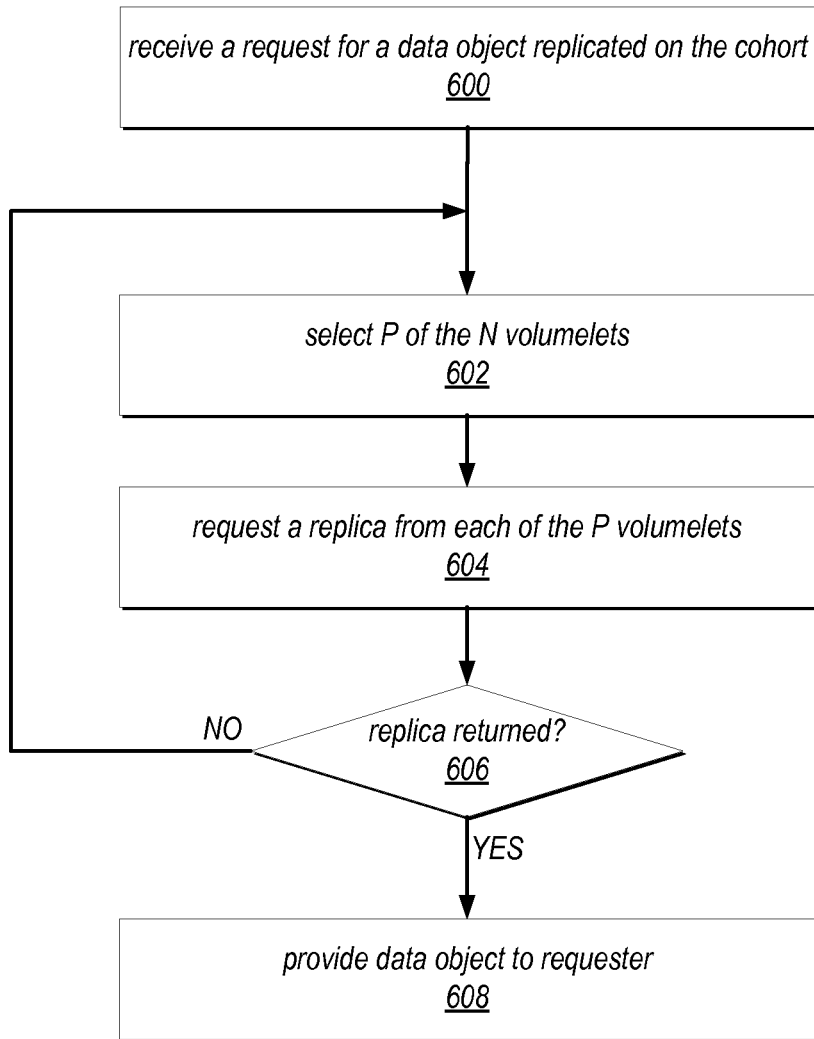
FIG. 6 is a high-level flowchart of a method for retrieving data objects from a cohort in which the data objects are stored according to a replication technique, according to at least some embodiments.

FIG. 6 is a high-level flowchart of a method for retrieving data objects from a cohort in which the data objects are stored according to a replication technique, according to at least some embodiments. The method may, for example, be performed by or via a storage service implemented on one or more devices. An example system on which embodiments of a storage service may be implemented is shown in FIG. 8. Note that, in a replication technique, only one replica needs to be retrieved from the cohort to retrieve the data object.

As indicated at 600, a request for a data object stored to the cohort may be received, for example from one of one or more clients of the storage service. The data object may have been previously stored to the cohort according to a replication technique that generates M replicas of the data object and stores one of the replicas to each of M volumelets selected from the N volumelets in the cohort.

As indicated at 602, P of the N volumelets in the cohort may be selected. Different techniques may be used to select the P volumelets. For example, in some embodiments, a random or pseudo-random selection technique may be used. In some embodiments, an identity of the data object (or a transformation thereof, such as a hash) may be used in determining at least some of the P volumelets. Note that, generally, P may be equal to or less than M. However, P could be any number from 1 up to and including N.

As indicated at 604, a replica of the data object may be requested from each of the selected P volumelets. At 606, if a replica is returned from at least one of the P volumelets, then the data object may be provided to the requestor as indicated at 608. Otherwise, at 604, the method may return to 602 and select a non-overlapping set of P (or some other number of) volumelets and request the data object from the new set of volumelet(s).

Figure 7:
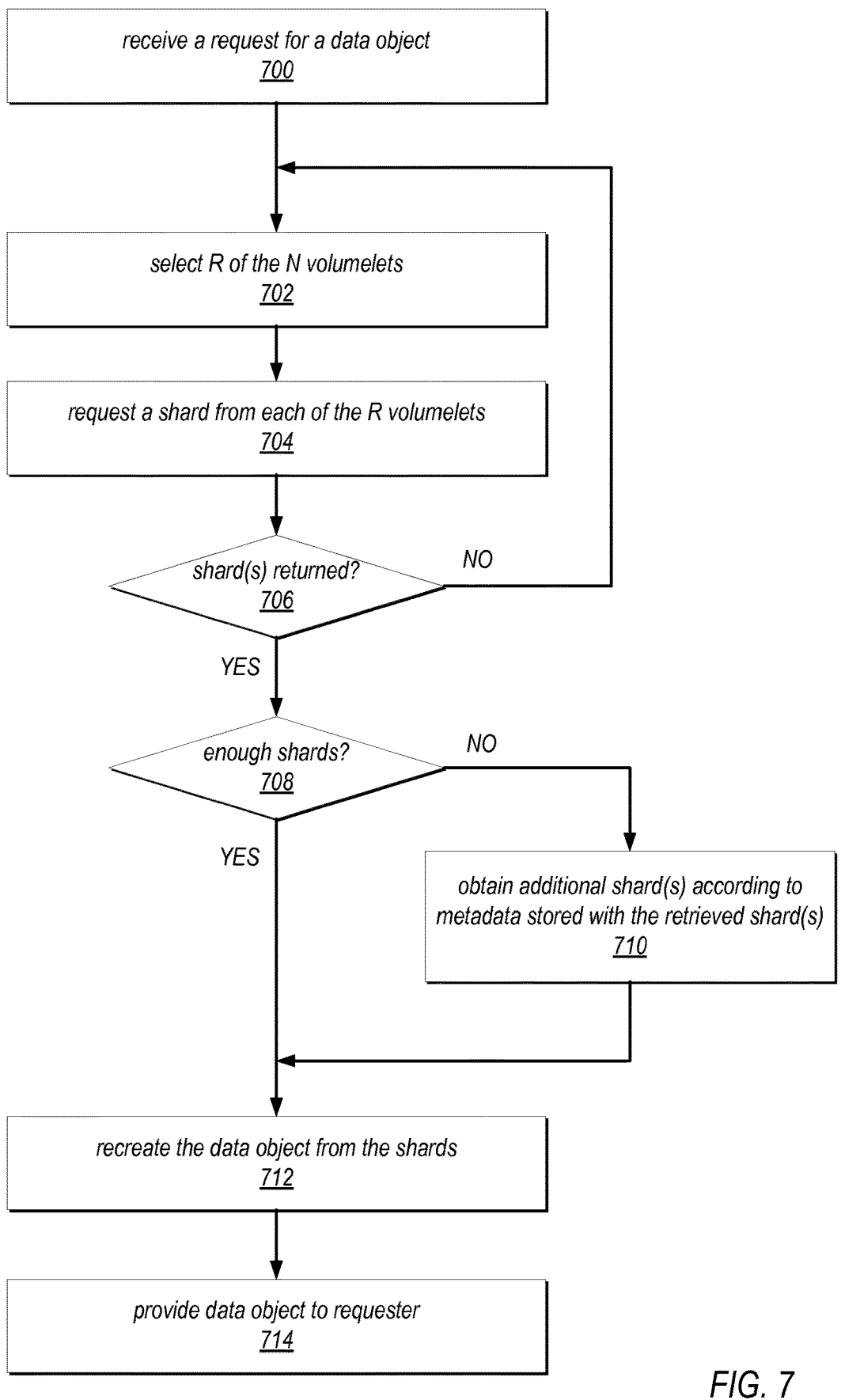
FIG. 7 is a high-level flowchart of a method for retrieving data objects from a cohort in which the data objects are stored according to a redundant encoding technique, according to at least some embodiments.

FIG. 7 is a high-level flowchart of a method for retrieving data objects from a cohort in which the data objects are stored according to a redundant encoding technique, according to at least some embodiments. The method may, for example, be performed by or via a storage service implemented on one or more devices. An example system on which embodiments of a storage service may be implemented is shown in FIG. 8. Note that, in a redundant encoding technique, some minimum number of the shards created from a data object is required to recreate the data object. In this document, R is used to represent the minimum number of shards needed to recreate a data object, while M is used to represent the total number of shards created from a data object and stored to a subset of M volumelets selected from the N volumelets in a cohort. Note that generally but not necessarily, R=M/2. For example, in a non-limiting example erasure encoding scheme, M=20, and R=10.

As indicated at 700, a request for a data object stored to the cohort may be received, for example from one of one or more clients of the storage service. The data object may have been previously stored to the cohort according to a redundant encoding technique that generates M shards of the data object and stores one of the shards to each of M volumelets selected from the N volumelets in the cohort.

As indicated at 702, R of the N volumelets in the cohort may be selected. Different techniques may be used to select the R volumelets. For example, in some embodiments, a random or pseudo-random selection technique may be used. In some embodiments, an identity of the data object (or a transformation thereof, such as a hash) may be used in determining at least some of the R volumelets. Note that, in this example implementation, R is the minimum number of shards needed to recreate a data object according to the redundant encoding scheme being used, and thus R volumelets are at least initially selected to query for shards. However, more than or fewer than R volumelets may be selected to query in other implementations.

As indicated at 704, a shard of the data object may be requested from each of the selected R volumelets. Each of the queried R volumelets either does or does not store a shard for the data object. If one of the queried R volumelets has a shard for the data object, the volumelet returns the shard. If the volumelet also stores metadata for locating other shards in the cohort, the metadata may also be returned.

At 706, if no shards are returned from the selected R volumelets, then the method may return to 702, select a non-overlapping set of R (or some other number of) volumelets, and query the new set of volumelet(s) for the data object.

At 706, if at least one shard is returned from the selected R volumelets, then the storage service may determine if enough shards (i.e., at least R shards, where R is the minimum number of shards needed to recreate a data object according to the redundant encoding scheme being used) have been obtained to recreate the data object. At 708, if enough shards (i.e., at least R shards) have been obtained, then the method proceeds to 712.

At 708, if at least one but not enough (i.e., fewer than R) shards have been obtained, then in at least some embodiments the storage service may obtain one or additional shards from other volumelets in the cohort; the other volumelets may be located by the storage service according to the metadata that was stored with at least one of the retrieved shards and returned to the storage service with the shard(s) obtained from the R queried volumelets. Note that this metadata stored with a given one of the shards indicates the location in the cohort of at least one other shard, and in some embodiments indicates the location of every shard.

Alternatively, instead of using metadata retrieved with shard(s) to locate additional shards as indicated at 710, in some embodiments the method may instead return to 702, select a non-overlapping set of R (or some other number of) volumelets, and query the new set of volumelet(s) to retrieve additional shard(s).

At 712, once at least R shards have been retrieved from the cohort, then the data object may be recreated from the retrieved shards according to the redundant encoding scheme being used, for example an erasure encoding scheme. The recreated data object may then be provided to the requester, for example one of one or more clients of the storage service.

Illustrative System

In at least some embodiments, a server that implements a portion or all of the methods and apparatus for volume cohorts in object-redundant storage systems as described herein may include a general-purpose computer system that includes or is configured to access one or more computer-accessible media, such as computer system 2000 illustrated in FIG. 8. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for volume cohorts in object-redundant storage systems, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 7, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 7 for implementing embodiments of volume cohorts in object-redundant storage systems. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of storage nodes;
one or more processors; and
a memory that stores program instructions executable by at least one of the one or more processors to implement an object-redundant storage system configured to:
  establish at least two cohorts including:
    a particular cohort spanning N storage nodes of the plurality of storage nodes, and
    a different cohort spanning A storage nodes of the plurality of storage nodes, wherein each of the A storage nodes differs from each of the N storage nodes of the particular cohort,
    wherein the particular cohort and the different cohort are concurrently available for data storage;
  receive from one or more clients external to the system, at least two data objects to be stored to the storage system;
  for a particular received data object of the at least two received data objects:
    generate M data elements from the particular received data object according to an object-redundant technique, where M is less than N;
    select M storage nodes from among only the N storage nodes in the particular cohort according to a selection technique for the particular data object; and
    store each of the M data elements to a corresponding one of the selected M storage nodes, wherein one of the M data elements is stored on each of the M storage nodes and wherein at least one of the N storage nodes of the particular cohort does not store any of the M data elements; and
  for a different received data object of the at least two received data objects:

generate B data elements from the different received data object according to an object-redundant technique, where B is less than A;

select B storage nodes from among only the A storage nodes in the different cohort according to a selection technique for the different data object; and store each of the B data elements to a corresponding one of the selected B storage nodes, wherein at least one of the A storage nodes does not store any of the B data elements.

2. The system as recited in claim 1, wherein the object-redundant technique is a replication technique, and wherein the respective object-redundant data elements are replicas of the respective data object.

3. The system as recited in claim 1, wherein the object-redundant technique is an erasure encoding technique, wherein the object-redundant data elements are shards generated from the respective data object, and wherein a subset of at least R of the M shards generated for a given data object according to the redundant encoding technique are required to recreate the respective data object.

4. The system as recited in claim 1, wherein the object-redundant storage system is further configured to, for at least one of the data objects:

generate, for at least one of the data elements generated for the data object, metadata indicating one or more locations in the respective cohort at which one or more others of the data elements of the data object are stored; and store the metadata with the respective at least one data element on the storage node at which the at least one data element is stored.

5. The system as recited in claim 1, wherein the object-redundant storage system is further configured to:

receive a request for a data object stored to the storage system;

select a subset of the storage nodes in the cohort corresponding to the requested data object; and query the selected subset of storage nodes for data elements corresponding to the requested data object.

6. The system as recited in claim 5, wherein the object-redundant storage system is further configured to:

select another subset of the storage nodes in the cohort corresponding to the requested data object; and query the other subset of storage nodes for data elements corresponding to the requested data object.

7. The system as recited in claim 5, wherein the object-redundant storage system is further configured to receive at least one data element corresponding to the requested data object from the queried subset of storage nodes.

8. The system as recited in claim 7, wherein the object-redundant storage system is further configured to:

determine that at least one more data element corresponding to the requested data object is needed; and query at least one additional storage node in the cohort for at least one more data element.

9. The system as recited in claim 8, wherein the object-redundant storage system is further configured to:

receive, with the at least one data element received from the queried subset of storage nodes, metadata indicating one or more locations in the respective cohort at which one or more others of the data elements for the requested data object are stored;

wherein, to query at least one additional storage node in the cohort for at least one more data element, the object-redundant storage system is further configured to determine the at least one additional storage node from the received metadata.

10. The system as recited in claim 1, wherein the selection technique randomly selects at least one of the M storage nodes from among the N storage nodes in the particular cohort.

11. The system as recited in claim 1, wherein the selection technique selects at least one the M storage nodes according to an identity of the particular data object.

12. A method, comprising:

receiving, by a storage service implemented on one or more computing devices, data objects to be stored to an object-redundant storage system, wherein the object-redundant storage system comprises a cohort spanning N storage nodes, and the storage system also comprises a plurality of other storage nodes separate from the cohort, wherein the cohort and at least some of the other storage nodes are concurrently available for data storage;

for a received particular data object:

generating M data elements from the particular data object according to an object-redundant technique, where M is less than N;

selecting M storage nodes from among only the N storage nodes in the cohort;

storing the M data elements to the selected M storage nodes, wherein only one corresponding data element of the M data elements is stored on each respective one of the M storage nodes; and storing, in one of the selected M storage nodes at which a data element has been stored, metadata indicating respective locations in the cohort at which each of a plurality of others of the M data elements are stored.

13. The method as recited in claim 12, wherein the object-redundant technique is a replication technique.

14. The method as recited in claim 12, wherein the selection technique is one of a technique that randomly selects at least one of the M storage nodes or a technique that selects at least one the M storage nodes according to an identity of the respective data object.

15. The method as recited in claim 12, further comprising:

receiving a request for a data object stored to the storage system;

selecting a subset of the N storage nodes in the cohort;

querying the selected subset of storage nodes for data elements corresponding to the requested data object; and receiving at least one data element corresponding to the requested data object from the queried subset of storage nodes.

16. The method as recited in claim 15, further comprising:

determining that at least one more data element corresponding to the requested data object is needed;

determining at least one additional storage node that contains a data element corresponding to the requested data object from the metadata indicating one or more locations in the cohort at which one or more of the M data elements are stored; and querying the at least one additional storage node in the cohort for at least one more data element.

17. A non-transitory computer-accessible storage medium storing program instructions executable on one or more computers to implement an object-redundant storage system configured to:

receive data objects to be redundantly stored to a storage system that comprises a set of N storage nodes, wherein the storage system also comprises a plurality of other storage nodes separate from the N storage nodes, wherein the N storage nodes and at least some of the other storage nodes are concurrently available for data storage;

for a received particular data object:
generate M data elements from the data object according to an object-redundant technique, where M is less than N;
select M storage nodes from among only the N storage nodes;
store each of the M data elements to a corresponding one of the selected M storage nodes, wherein only one corresponding data element of the M data elements is stored on each respective one of the M storage nodes; and
store, with one of the M data elements in the corresponding storage node, metadata indicating, for each other data element of the data object, a corresponding location at which the respective data element is stored.

18. The non-transitory computer-accessible storage medium as recited in claim 17, wherein the object-redundant technique is one of a replication technique or an erasure coding technique.

19. The non-transitory computer-accessible storage medium as recited in claim 17, wherein the M nodes are selected according to a selection technique that comprises one of a technique that randomly selects at least one of the M storage nodes or a technique that selects at least one of the M storage nodes according to an identity of the respective data object.

20. The non-transitory computer-accessible storage medium as recited in claim 17, wherein the object-redundant storage system is further configured to:
receive a request for a data object stored to the storage system;
select a subset of the N storage nodes;
query the selected subset of storage nodes for data elements corresponding to the requested data object; and
receive at least one data element corresponding to the requested data object from the queried subset of storage nodes.

21. The non-transitory computer-accessible storage medium as recited in claim 20, wherein the object-redundant storage system is further configured to:
determine that at least one more data element corresponding to the requested data object is needed;
determine at least one additional storage node that contains a data element corresponding to the requested data object from the metadata stored with the data elements; and
query the at least one additional storage node for at least one more data element.

22. The method as recited in claim 12, wherein the object-redundant technique is an erasure coding technique.

* * * * *